US008635422B1

(12) United States Patent
Kaliannan et al.

(10) Patent No.: US 8,635,422 B1
(45) Date of Patent: Jan. 21, 2014

(54) SYSTEMS AND METHODS FOR RECLAIMING STORAGE SPACE FROM DELETED VOLUMES ON THIN-PROVISIONED DISKS

(75) Inventors: Kirubakaran Kaliannan, Beaverton, OR (US); Michael E. Root, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 465 days.

(21) Appl. No.: 12/608,766

(22) Filed: Oct. 29, 2009

(51) Int. Cl.
*G06F 12/00* (2006.01)
*G06F 13/00* (2006.01)
*G06F 13/28* (2006.01)

(52) U.S. Cl.
USPC .......................................................... 711/170

(58) Field of Classification Search
USPC .......................................................... 711/170
See application file for complete search history.

(56) References Cited

U.S. PATENT DOCUMENTS

| | | | |
|---|---|---|---|
| 6,952,757 B2 * | 10/2005 | Carlson et al. ................ | 711/161 |
| 7,386,663 B2 | 6/2008 | Cousins | |
| 2002/0065984 A1 * | 5/2002 | Thompson et al. ........... | 711/114 |
| 2003/0177379 A1 * | 9/2003 | Hori et al. ..................... | 713/193 |
| 2004/0107314 A1 * | 6/2004 | Kim et al. ..................... | 711/114 |
| 2007/0030734 A1 * | 2/2007 | Sinclair et al. ........... | 365/185.11 |
| 2008/0126734 A1 | 5/2008 | Murase | |
| 2009/0077327 A1 * | 3/2009 | Hara ............................ | 711/154 |
| 2009/0089516 A1 * | 4/2009 | Pelts et al. ................... | 711/154 |

OTHER PUBLICATIONS

Kirubakaran Kaliannan, et al.; Systems and Methods for Reclaiming Storage Space on Striped Volumes; U.S. Appl. No. 12/608,740, filed Oct. 29, 2009.

* cited by examiner

*Primary Examiner* — Matthew Bradley
*Assistant Examiner* — Craig Goldschmidt
(74) *Attorney, Agent, or Firm* — ALG Intellectual Property, LLC (57) ABSTRACT

A computer-implemented method for reclaiming storage space from deleted volumes on thin-provisioned disks may include: 1) identifying a deleted volume, 2) identifying storage space on a thin-provisioned disk that was allocated to the deleted volume, 3) saving information that identifies the storage space, 4) identifying a policy that specifies reclaiming the storage space asynchronously with respect to the deleted volume, and then 5) reclaiming the storage space asynchronously with respect to deletion of the volume in accordance with the policy. Various other methods, systems, and computer-readable media are also disclosed.

16 Claims, 6 Drawing Sheets

SYSTEMS AND METHODS FOR RECLAIMING STORAGE SPACE FROM DELETED VOLUMES ON THIN-PROVISIONED DISKS

BACKGROUND

Organizations with high volumes of data have long sought to maximize data storage performance while minimizing the cost of storage. Because of this, some organizations have turned to thin-provisioning solutions in an effort to efficiently utilize available storage space. Thin-provisioning solutions may allocate storage space from a common pool to computing systems as needed, which may help prevent storage space from going to waste.

Unfortunately, some operations within conventional thin provisioning solutions may degrade system performance. For example, when a volume is deleted from a thin-provisioned disk, reclaiming the storage space previously allocated to the deleted volume may consume system resources roughly in proportion to the size of the volume, potentially degrading system input/output ("I/O") performance. Moreover, because the storage space previously allocated to the deleted volume cannot be reused until it has been reclaimed, many conventional thin-provisioning systems attempt to reclaim this storage space synchronously (i.e., concurrently or simultaneously) with respect to deletion of the volume, which may needlessly increase the amount of time required to delete a volume from a thin-provisioned system. In addition, immediate or synchronous reclamation of such storage space may prevent a user from restoring a deleted volume in the case of accidental deletion.

SUMMARY

As will be described in greater detail below, the instant disclosure generally relates to systems and methods for efficiently reclaiming storage space from deleted volumes on thin-provisioned disks in order to reduce interference with application I/O. In one example, the various systems described herein may accomplish this task by: 1) identifying a deleted volume, 2) identifying storage space on a thin-provisioned disk that was allocated to the deleted volume, 3) storing or saving information that identifies the storage space (e.g., information that identifies the location of the storage space allocated to the deleted volume), 4) identifying a policy that specifies reclaiming the storage space asynchronously with respect to deletion of the volume, and then 5) reclaiming the storage space asynchronously with respect to deletion of the volume in accordance with the policy (by, e.g., reclaiming the storage space when an input/out system that includes the storage space is idle).

In one example, saving information that identifies the storage space may include saving the information on each disk that has storage space allocated for the deleted volume. In an additional example, saving information that identifies the storage space may include: 1) marking each disk that has storage space allocated for the deleted volume and then 2) for each disk, saving information that identifies the location of the storage space on the disk that was allocated to the deleted volume.

In some embodiments, the policy may represent a policy to reclaim the storage space at a predetermined time of day and/or when an input/output system that includes the storage space is idle. In these embodiments, the systems disclosed herein may also: 1) monitor the input/output system to determine when it is idle and 2) monitor applications that use the input/output system to determine when they are idle. In certain examples, reclaiming the storage space asynchronously with respect to deletion of the volume in accordance with the policy may include launching a daemon for reclaiming the storage space.

In some examples, reclaiming the storage space asynchronously with respect to deletion of the volume in accordance with the policy may include: 1) identifying a request to create a new volume and then 2) reallocating at least a part of the storage space for the new volume. In addition, reclaiming the storage space asynchronously with respect to deletion of the volume in accordance with the policy may include: 1) receiving a request to recover data from the storage space before reclaiming the storage space and then 2) delaying reclamation of the storage space until after the request is fulfilled. In some examples, reclaiming the storage space asynchronously with respect to deletion of the volume in accordance with the policy may include deleting the information that identifies the storage space.

As detailed above, by saving information that identifies the storage space that was allocated to a deleted volume and/or by delaying the reclamation of this storage space until reclamation will not interfere (or will interfere less) with application I/O, the systems and methods described herein may reduce or eliminate the I/O degradation problems commonly associated with reclaiming storage space on thin-provisioned clients. These systems and methods may also enable system administrators to recover data from a deleted volume and/or efficiently create a new volume.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for efficiently reclaiming storage space from deleted volumes on thin-provisioned disks. As used herein, the phrase "thin-provisioned disk" may refer to any storage system and/or disk array capable of storing data for a volume. In some embodiments, the phrase "thin-provisioned disk" may refer to a storage system and/or device that allocates storage space for a computing system on an as-needed and/or just-in-time basis.

Figure 1:
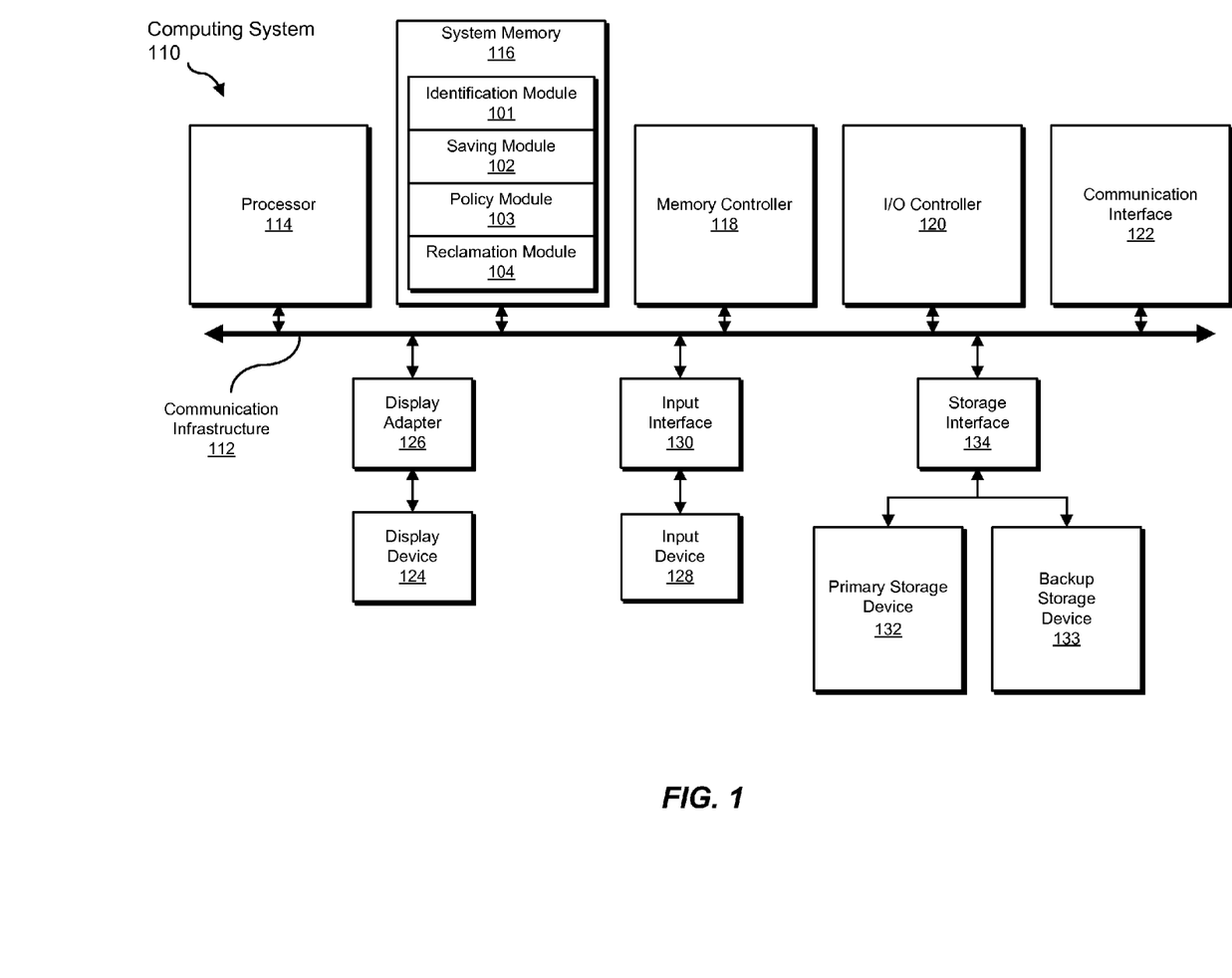
FIG. 1 is a block diagram of an exemplary computing system capable of implementing one or more of the embodiments described and/or illustrated herein.
Figure 2:
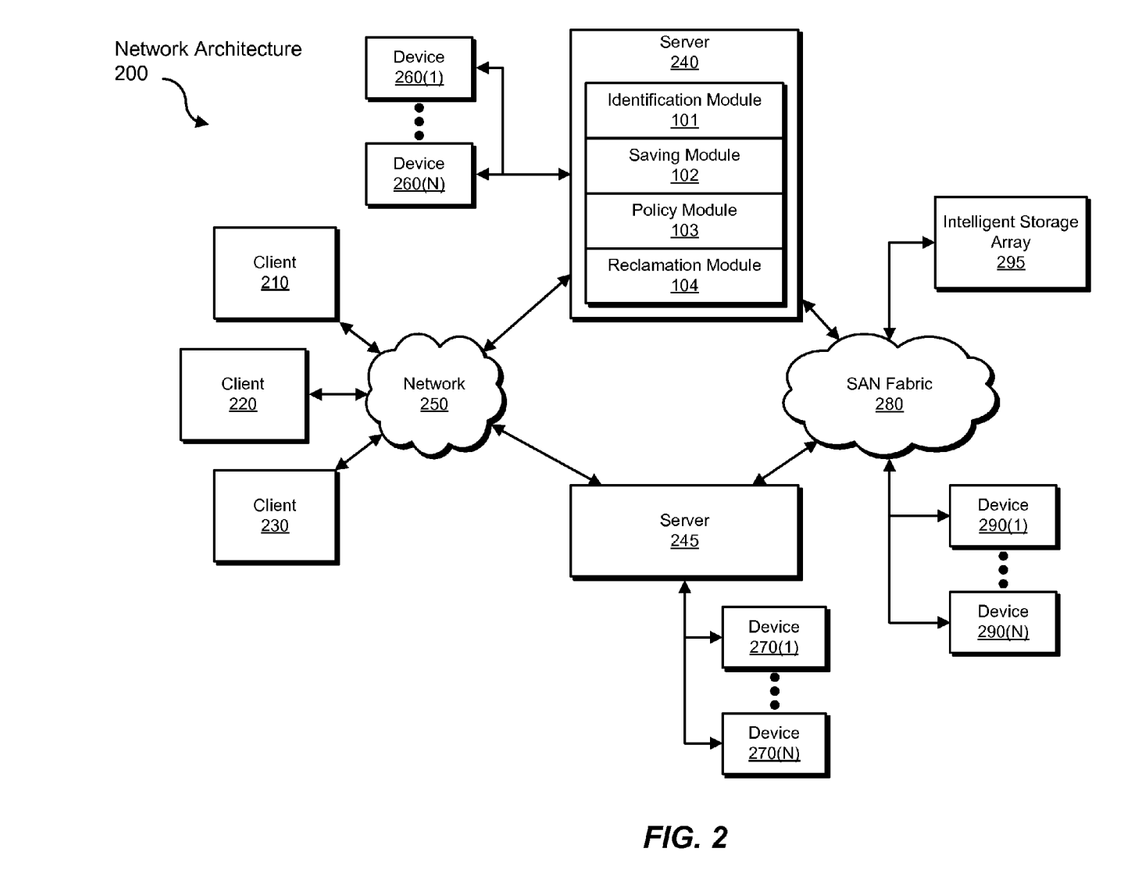
FIG. 2 is a block diagram of an exemplary computing network capable of implementing one or more of the embodiments described and/or illustrated herein.

The following will provide, with reference to FIGS. 1 and 2, detailed descriptions of an exemplary computing system and network architecture capable of implementing one or more of the embodiments described herein. In addition, detailed descriptions of exemplary systems for reclaiming storage space from deleted volumes on thin-provisioned disks will be provided with reference to FIGS. 3-4. Detailed descriptions of corresponding computer-implemented methods will also be provided in connection with FIGS. 5-6.

FIG. 1 is a block diagram of an exemplary computing system 110 capable of implementing one or more of the embodiments described and/or illustrated herein. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the exemplary embodiments described and/or illustrated herein. For example, processor 114 may perform and/or be a means for performing, either alone or in combination with other elements, one or more of the identifying, saving, reclaiming, marking, monitoring, reallocating, receiving, and/or delaying steps described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, random access memory (RAM), read only memory (ROM), flash memory, or any other suitable memory device. Although not required, in certain embodiments computing system 110 may include both a volatile memory unit (such as, for example, system memory 116) and a non-volatile storage device (such as, for example, primary storage device 132, as described in detail below). In one example, one or more of modules 310 from FIG. 3 may be loaded into system memory 116.

In certain embodiments, exemplary computing system 110 may also include one or more components or elements in addition to processor 114 and system memory 116. For example, as illustrated in FIG. 1, computing system 110 may include a memory controller 118, an I/O controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an ISA, PCI, PCIe, or similar bus) and a network.

Memory controller 118 generally represents any type or form of device capable of handling memory or data or controlling communication between one or more components of computing system 110. For example, in certain embodiments memory controller 118 may control communication between processor 114, system memory 116, and I/O controller 120 via communication infrastructure 112. In certain embodiments, memory controller 118 may perform and/or be a means for performing, either alone or in combination with other elements, one or more of the steps or features described and/or illustrated herein, such as identifying, saving, reclaiming, marking, monitoring, reallocating, receiving, and/or delaying.

I/O controller 120 generally represents any type or form of module capable of coordinating and/or controlling the input and output functions of a computing device. For example, in certain embodiments I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the identifying, saving, reclaiming, marking, monitoring, reallocating, receiving, and/or delaying steps described herein. I/O controller 120 may also be used to perform and/or be a means for performing other steps and features set forth in the instant disclosure.

Communication interface 122 broadly represents any type or form of communication device or adapter capable of facilitating communication between exemplary computing system 110 and one or more additional devices. For example, in certain embodiments communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In at least one embodiment, communication interface 122 may provide a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

In certain embodiments, communication interface 122 may also represent a host adapter configured to facilitate communication between computing system 110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. In certain embodiments, communication interface 122 may perform and/or be a means for performing, either alone or in combination with other elements, one or more of the identifying, saving, reclaiming, marking, monitoring, reallocating, receiving, and/or delaying steps disclosed herein. Communication interface 122 may also be used to perform and/or be a means for performing other steps and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, exemplary computing system 110 may also include at least one input device 128 coupled to communication infrastructure 112 via an input interface 130. Input device 128 generally represents any type or form of input device capable of providing input, either computer or human generated, to exemplary computing system 110. Examples of input device 128 include, without limitation, a keyboard, a pointing device, a speech recognition device, or any other input device. In at least one embodiment, input device 128 may perform and/or be a means for performing, either alone or in combination with other elements, one or more of the identifying, saving, reclaiming, marking, monitoring, reallocating, receiving, and/or delaying steps disclosed herein. Input device 128 may also be used to perform and/or be a means for performing other steps and features set forth in the instant disclosure.

As illustrated in FIG. 1, exemplary computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In certain embodiments, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be a separate device accessed through other interface systems.

In certain embodiments, storage devices 132 and 133 may be used, for example, to perform and/or be a means for performing, either alone or in combination with other elements, one or more of the identifying, saving, reclaiming, marking, monitoring, reallocating, receiving, and/or delaying steps disclosed herein. Storage devices 132 and 133 may also be used to perform and/or be a means for performing other steps and features set forth in the instant disclosure.

Many other devices or subsystems may be connected to computing system 110. Conversely, all of the components and devices illustrated in FIG. 1 need not be present to practice the embodiments described and/or illustrated herein. The devices and subsystems referenced above may also be interconnected in different ways from that shown in FIG. 1. Computing system 110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 110 may be configured as an application specific integrated circuit (ASIC) adapted to implement one or more of the exemplary embodiments disclosed herein.

FIG. 2 is a block diagram of an exemplary network architecture 200 in which client systems 210, 220, and 230 and servers 240 and 245 may be coupled to a network 250. Client systems 210, 220, and 230 generally represent any type or form of computing device or system, such as exemplary computing system 110 in FIG. 1.

Similarly, servers 240 and 245 generally represent computing devices or systems, such as application servers or database servers, configured to provide various database services and/or run certain software applications. In one example, server 240 may include system 300 from FIG. 3 (e.g., modules 310, including identification module 101, saving module 102, policy module 103, and reclamation module 104).

Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(N) may be directly attached to server 240. Similarly, one or more storage devices 270(1)-(N) may be directly attached to server 245. Storage devices 260(1)-(N) and storage devices 270(1)-(N) generally represent any type or form of storage device or medium capable of storing data and/or other computer-readable instructions. In certain embodiments, storage devices 260(1)-(N) and storage devices 270(1)-(N) may represent network-attached storage (NAS) devices configured to communicate with servers 240 and 245 using various protocols, such as NFS, SMB, or CIFS.

Servers 240 and 245 may also be connected to a storage area network (SAN) fabric 280. SAN fabric 280 generally represents any type or form of computer network or architecture capable of facilitating communication between a plurality of storage devices. SAN fabric 280 may facilitate communication between servers 240 and 245 and a plurality of storage devices 290(1)-(N) and/or an intelligent storage array 295. SAN fabric 280 may also facilitate, via network 250 and servers 240 and 245, communication between client systems 210, 220, and 230 and storage devices 290(1)-(N) and/or intelligent storage array 295 in such a manner that devices 290(1)-(N) and array 295 appear as locally attached devices to client systems 210, 220, and 230. As with storage devices 260(1)-(N) and storage devices 270(1)-(N), storage devices 290(1)-(N) and intelligent storage array 295 generally represent any type or form of storage device or medium capable of storing data and/or other computer-readable instructions.

In certain embodiments, and with reference to exemplary computing system 110 of FIG. 1, a communication interface, such as communication interface 122 in FIG. 1, may be used to provide connectivity between each client system 210, 220, and 230 and network 250. Client systems 210, 220, and 230 may be able to access information on server 240 or 245 using, for example, a web browser or other client software. Such software may allow client systems 210, 220, and 230 to access data hosted by server 240, server 245, storage devices 260(1)-(N), storage devices 270(1)-(N), storage devices 290(1)-(N), or intelligent storage array 295. Although FIG. 2 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 240, server 245, storage devices 260(1)-(N), storage devices 270(1)-(N), storage devices 290(1)-(N), intelligent storage array 295, or any combination thereof. All or a portion of one or more of the exemplary embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the identifying, saving, reclaiming, marking, monitoring, reallocating, receiving, and/or delaying steps disclosed herein. Network architecture 200 may also be used to perform and/or be a means for performing other steps and features set forth in the instant disclosure.

As detailed above, computing system 110 and/or one or more components of network architecture 200 may perform and/or be a means for performing, either alone or in combination with other elements, one or more steps of an exemplary method for reclaiming storage space from deleted volumes on thin-provisioned disks.

Figure 3:
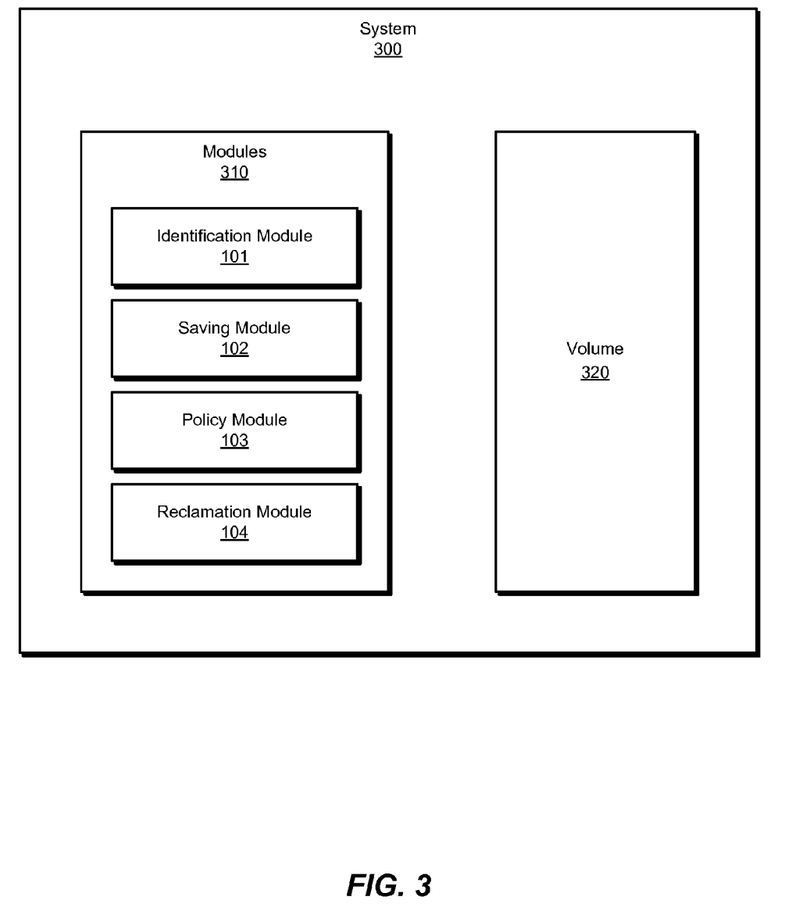
FIG. 3 is a block diagram of an exemplary system for reclaiming storage space from deleted volumes on thin-provisioned disks.

FIG. 3 is a block diagram of an exemplary system 300 for reclaiming storage space from deleted volumes on thin-provisioned disks. As illustrated in this figure, exemplary system 300 may include one or more modules 310 for performing one or more tasks. For example, and as will be explained in greater detail below, exemplary system 300 may include an identification module 101 programmed to identify a deleted volume and identify storage space on a thin-provisioned disk that was allocated to the deleted volume. Exemplary system 300 may also include a saving module 102 programmed to save information that identifies the storage space.

In addition, and as will be described in greater detail below, exemplary system 300 may include a policy module 103 programmed to identify a policy that specifies reclaiming the storage space asynchronously with respect to deletion of the volume. Furthermore, exemplary system 300 may include a reclamation module 104 programmed to reclaim the storage space asynchronously with respect to deletion of the volume in accordance with the policy. Although illustrated as separate elements, one or more of modules 310 in FIG. 3 may represent portions of a single module or application.

In certain embodiments, one or more of modules 310 in FIG. 3 may represent one or more software applications or programs that, when executed by a computing device, may cause the computing device to perform one or more tasks. For example, as will be described in greater detail below, one or more of modules 310 may represent software modules stored and configured to run on one or more computing devices, such as the devices illustrated in FIG. 4 (e.g., computing device 402), computing system 110 in FIG. 1, and/or portions of exemplary network architecture 200 in FIG. 2. One or more of modules 310 in FIG. 3 may also represent all or portions of one or more special-purpose computers configured to perform one or more tasks.

As illustrated in FIG. 3, exemplary system 300 may also include a volume 320. Volume 320 in FIG. 3 may represent a portion of one or more computing devices. For example, volume 320 may represent a portion of computing system 402 in FIG. 4, computing system 110 in FIG. 1, and/or portions of exemplary network architecture 200 in FIG. 2. Alternatively, volume 320 in FIG. 3 may represent a portion of one or more physically separate devices capable of being accessed by a computing device, such as computing system 110 in FIG. 1 and/or portions of exemplary network architecture 200 in FIG. 2.

Figure 4:
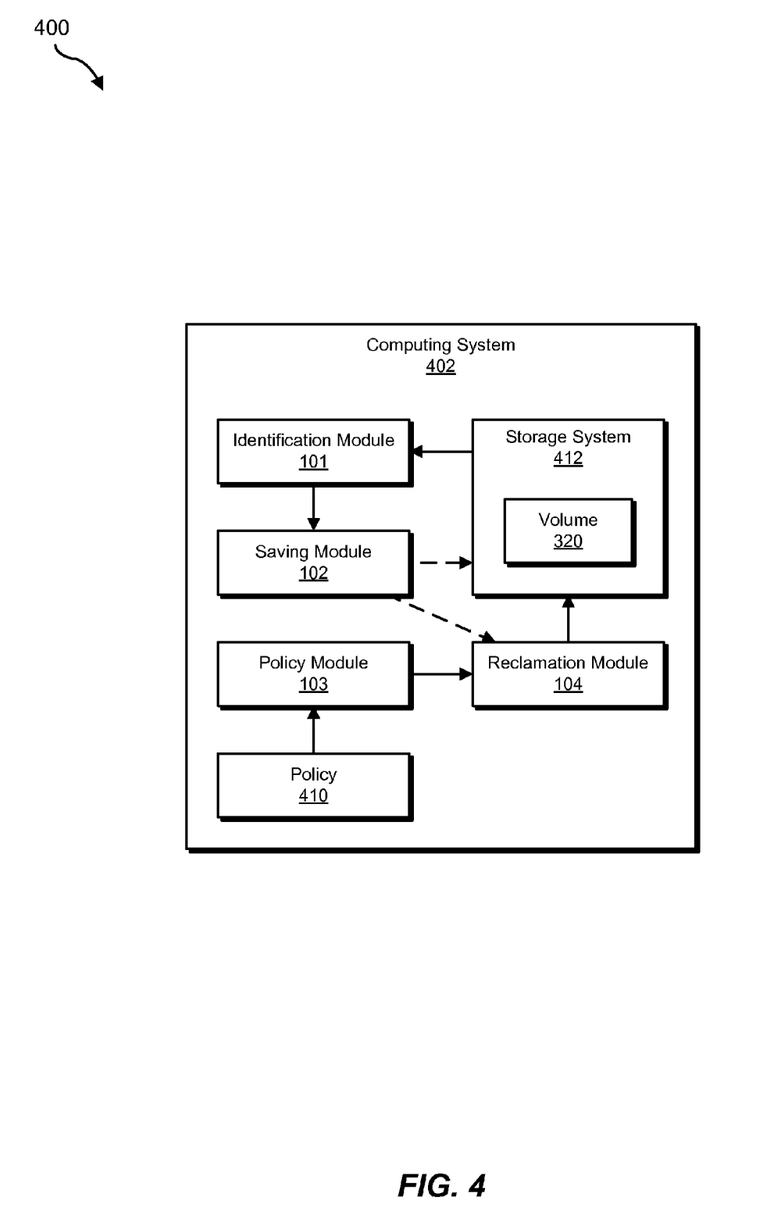
FIG. 4 is a block diagram of an exemplary system for reclaiming storage space from deleted volumes on thin-provisioned disks.

Exemplary system 300 in FIG. 3 may be deployed in a variety of ways. For example, all or a portion of exemplary system 300 may represent portions of system 400 in FIG. 4. As shown in FIG. 4, system 400 may include a computing system 402 with a storage system 412.

Computing system 402 generally represents any type or form of computing device capable of reading computer-executable instructions. Examples of computing system 402 include, without limitation, laptops, desktops, servers, cellular phones, personal digital assistants (PDAs), multimedia players, embedded systems, combinations of one or more of the same, exemplary computing system 110 in FIG. 1, or any other suitable computing device.

In one embodiment, and as will be described in greater detail below, computing device 402 may be programmed to asynchronously reclaim storage space from deleted volumes on thin-provisioned disks. For example, computing system 402 may be programmed with identification module 101, saving module 102, policy module 103, and reclamation module 104 from FIG. 3. In this example, and as will be described in greater detail below, identification module 104 may identify a deleted volume, such as volume 320 on storage system 412, and then identify storage space on a thin-provisioned disk (e.g., part of storage system 412) that was allocated to the deleted volume. Saving module 102 may then save information that identifies this storage space (e.g., in storage system 412).

Policy module 103 may then identify a policy that specifies reclaiming the storage space asynchronously with respect to deletion of the volume (e.g., policy 410, which may specify reclaiming storage space asynchronously with respect to deletion of volume 320). Reclamation module 104 may then reclaim the storage space asynchronously with respect to deletion of the volume in accordance with the policy (e.g., reclamation module 104 may asynchronously reclaim the storage space previously allocated to volume 320 in accordance with policy 410).

Figure 5:
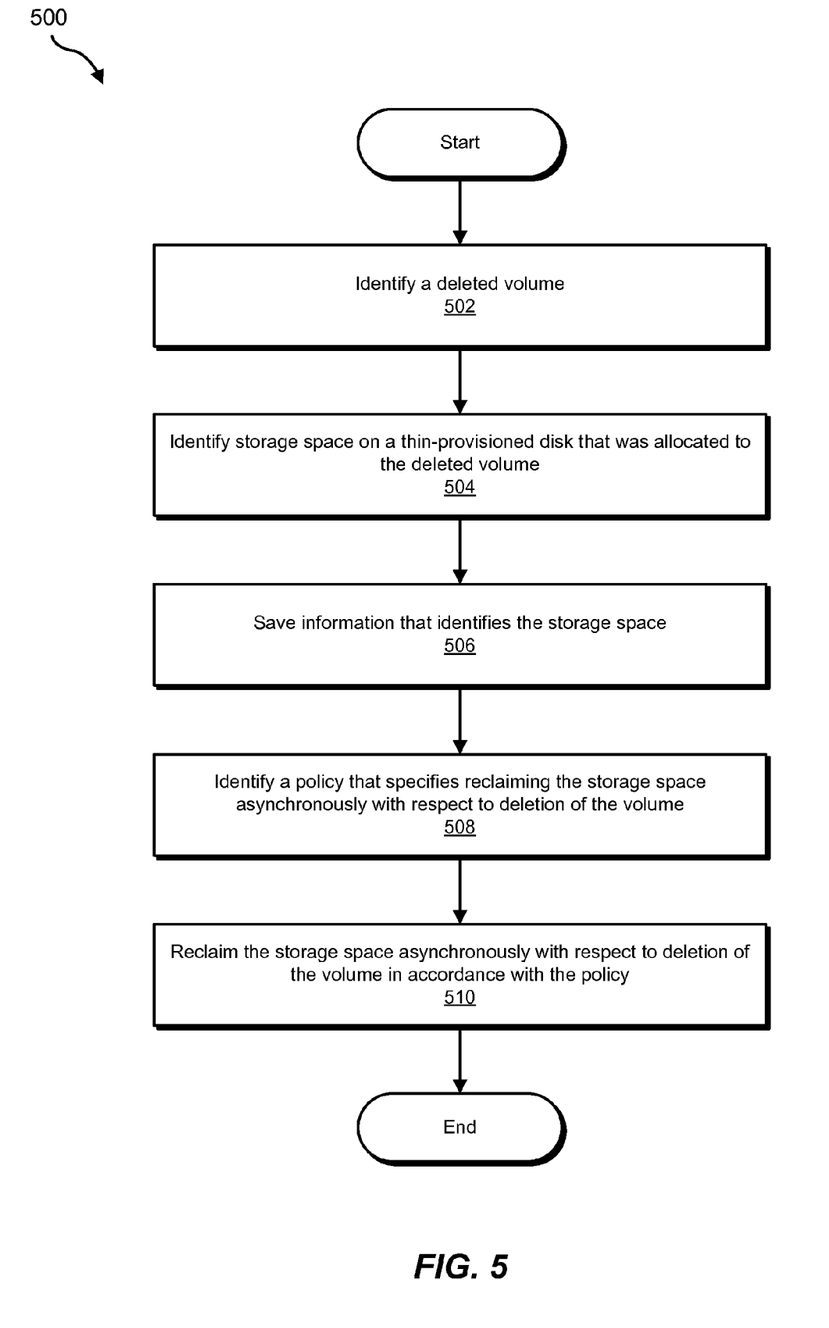
FIG. 5 is a flow diagram of an exemplary method for reclaiming storage space from deleted volumes on thin-provisioned disks.

FIG. 5 is a flow diagram of an exemplary computer-implemented method 500 for reclaiming storage space from deleted volumes on thin-provisioned disks. The steps shown in FIG. 5 may be performed by any suitable computer-executable code and/or computing system. In some embodiments, the steps shown in FIG. 5 may be performed by one or more of the components of system 300 in FIG. 3 and/or system 400 in FIG. 4.

As illustrated in FIG. 5, at step 502 one or more of the systems described herein may identify a deleted volume. For example, identification module 101 in FIG. 3 may, as part of computing system 402 in FIG. 4, identify volume 320. As used herein, the term "volume" may refer to any volume, drive, and/or partition of storage space. In some embodiments, a "volume" may refer to a volume of a thin-provisioned storage system.

Identification module 101 may identify the deleted volume in any suitable manner. For example, identification module 101 may identify the deleted volume by receiving a message from a file system that the deleted volume has been deleted. Additionally or alternatively, identification module 101 may identify the deleted volume by monitoring the deletion of the volume as part of a file system driver.

At step 504, one or more of the systems described herein may identify storage space on a thin-provisioned disk that was allocated to the deleted volume. For example, identification module 101 in FIG. 3 may, as part of computing system 402 in FIG. 4, identify storage space on storage system 412 that was allocated to volume 320. As detailed above, the phrase "thin-provisioned disk" may refer to any storage system and/or disk array capable of storing data for a volume. In some embodiments, the phrase "thin-provisioned disk" may refer to a storage system and/or device that allocates storage space for a computing system on an as-needed and/or just-in-time basis.

Identification module 101 may identify the storage space that was allocated to the deleted volume in any suitable manner. For example, identification module 101 may identify the storage space that was allocated to the deleted volume by reading configuration information related to the volume. In some examples, identification module 101 may read the configuration information from a configuration file. Additionally or alternatively, identification module 101 may query a file system for configuration information related to the volume.

At step 506, one or more of the systems described herein may save information that identifies the storage space identified in step 504. For example, saving module 102 in FIG. 3 may, as part of computing system 402 in FIG. 4, save information that identifies the storage space that was allocated to volume 320. As used herein, the phrase "information that identifies the storage space" may refer to any information helpful in locating, identifying, configuring, and/or manipulating storage space. For example, this information may refer to information that indicates the physical location of the storage space on one or more storage devices.

Saving module 102 may save information that identifies the storage space that was allocated to the deleted volume in a variety of ways. For example, saving module 102 may save the information in a file. Additionally or alternatively, saving module 102 may save the information in volatile memory. In some embodiments, saving module 102 may save the information on each disk that has storage space allocated for the deleted volume. For example, saving module 102 may mark each disk that has storage space allocated for the deleted volume (by, e.g., marking each disk as having storage space to reclaim). Saving module 102 may then save information, for each disk, that identifies storage space on the disk that was allocated to the deleted volume (e.g., saving module 102 may save information that identifies the physical location of the storage space that was allocated to the deleted volume). In general, saving module 102 may save this information in any manner and in any location that will enable future reclamation of the storage space previously allocated to the deleted volume.

At step 508, one or more of the systems described herein may identify a policy that specifies reclaiming the storage space asynchronously with respect to deletion of the volume. For example, policy module 103 in FIG. 3 may, as part of computing system 402, identify policy 410, which may, as detailed above, specify reclaiming storage space asynchronously with respect to deletion of volume 320 (e.g., policy 410 may specify reclaiming the storage space at a later time instead of at the time of deletion of volume 320). As used herein, the term "policy" may refer to any policy, configuration, registry entry, and/or tunable or default behavior capable of specifying, configuring, and/or directing a process and/or system component.

Policy module 103 may identify a variety of policies that specify reclaiming storage space asynchronously with respect to deletion of a volume. For example, policy module 103 may identify a policy that specifies reclaiming storage space at a predetermined time of day (e.g., the policy may specify that storage space previously allocated to deleted volumes should be reclaimed each day at 3:00 AM). Additionally or alternatively, the policy may specify a more intricate reclamation schedule, such as twice daily at 2:00 AM and 2:00 PM on weekdays only. In these examples, the policy may be set by a system administrator, who may select times when certain I/O performance sensitive applications are not running or require fewer resources.

In some examples, policy module 103 may identify a policy to reclaim the storage space identified in step 504 when an input/output system that includes the storage space is idle. For example, the policy may specify reclamation of the storage space when I/O activity is below a predetermined threshold for a predetermined period of time. In some embodiments, systems disclosed herein may monitor elements of I/O activity to determine when the input/output system is idle.

Figure 6:
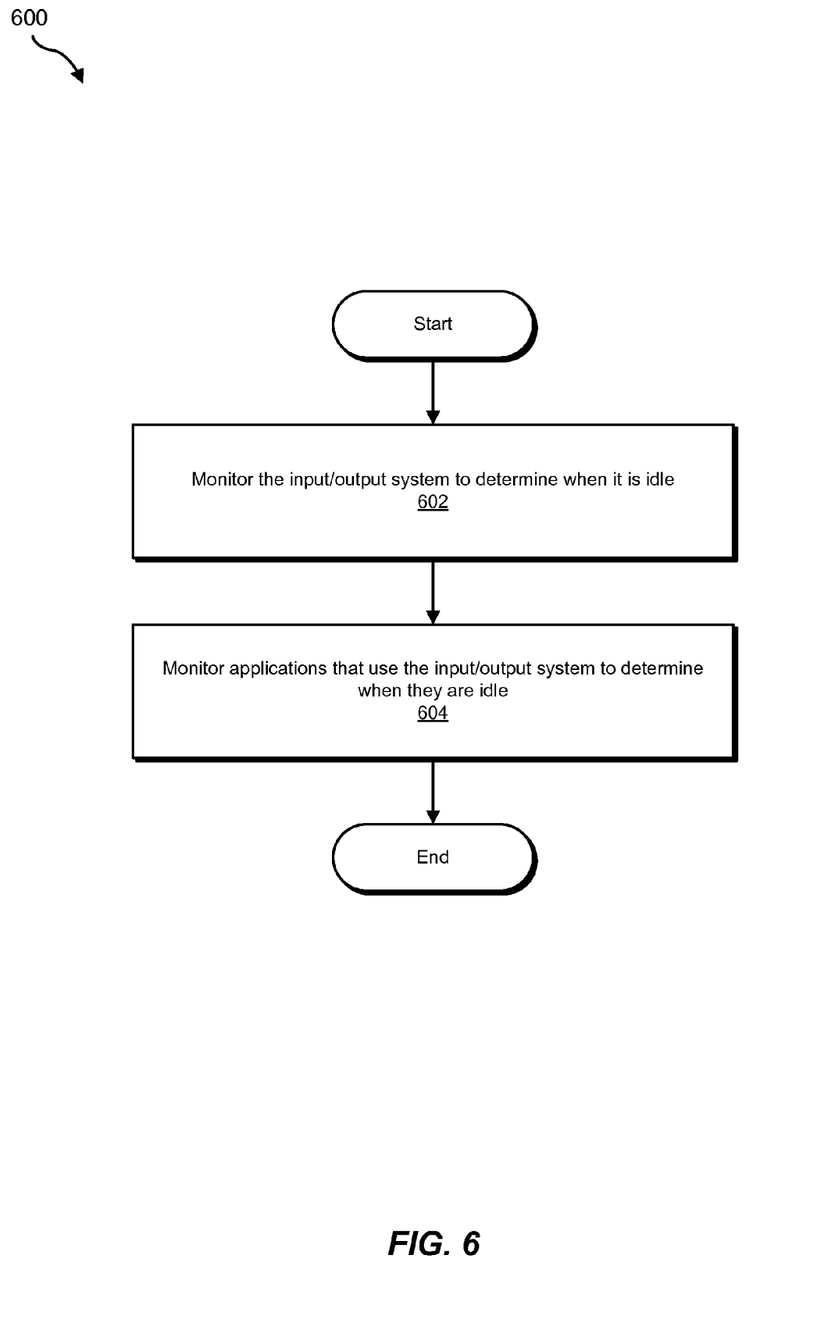
FIG. 6 is a flow diagram of an exemplary method for reclaiming storage space from deleted volumes on thin-provisioned disks.

For example, as illustrated in FIG. 6, at step 602 one or more of the systems disclosed herein may monitor the input/output system of a computing system to determine when it is idle. Additionally or alternatively, at step 604 the systems disclosed herein may monitor applications that use the input/output system to determine when they are idle. In some examples, these monitoring steps may contribute to the creation or configuration of the policy identified in step 508 in FIG. 5. For example, if 1:00 AM is observed to statistically represent the time of least input/output activity, a policy may be configured to specify reclamation of storage space at 1:00 AM. Additionally or alternatively, the policy may refer more directly to the results of the monitoring operation. For example, a policy may specify reclamation of storage space immediately upon determining that application activity drops below a predetermined threshold.

Returning to FIG. 5, at step 510 one or more of the systems described herein may reclaim the identified storage space asynchronously with respect to deletion of the volume in accordance with the policy. For example, reclamation module 104 in FIG. 3 may, as part of computing system 402 in FIG. 4, reclaim the identified storage space asynchronously with respect to deletion of volume 320 in accordance with policy 410.

Reclamation module 104 may reclaim the storage space in any suitable manner. For example, reclamation module 104 may reclaim the storage space by launching a daemon for reclaiming storage space. The daemon may reclaim storage space as dictated by the policy.

Reclamation module 104 may also reclaim the storage space in a variety of contexts. For example, reclamation module 104 may simply reclaim the storage space at a predetermined time specified by the policy. Additionally or alternatively, reclamation module 104 may identify a request to create a new volume and reallocate at least a part of the storage space for the new volume. For example, the policy may be configured to specify reclamation at a predetermined time of day or at the creation of a new volume, whichever comes first. By reallocating at least a part of the storage space for the new volume, reclamation module 104 may save time that would otherwise be spent reclaiming the storage space and/or allocating new storage space.

In another example, reclamation module 104 may reclaim the storage space only after a delay. For example, reclamation module 104 may receive a request to recover data from the storage space before reclaiming the storage space. The request may include an attempt to read data from the deleted volume, an attempt to restore a portion of the deleted volume, or any other operation requiring recovery of the data. After receiving the request, reclamation module 104 may delay reclamation of the storage space until after the request is fulfilled. For example, if the policy specifies reclamation of the storage space at 3:00 AM, and reclamation module 104 receives a request at 2:56 AM to recover the data of the deleted volume, reclamation module 104 may delay reclamation of the storage space until after the data has been recovered. In this example, reclamation module 104 may commence reclamation of the storage space immediately after the data is recovered or delay reclamation of the storage space until 3:00 AM on the subsequent day.

In some embodiments, reclamation module 104 may also, as part of reclaiming the storage space, delete the information that identifies the storage space. For example, if, as described earlier, the information that identifies the storage space is stored on each device on which the storage space was located, reclamation module 104 may delete this information from each device after the storage space from that device is reclaimed.

As detailed above, by saving information that identifies the storage space that was allocated to a deleted volume and/or by delaying the reclamation of this storage space until reclamation will not interfere (or will interfere less) with application I/O, the systems and methods described herein may reduce or eliminate the I/O degradation problems commonly associated with reclaiming storage space on thin-provisioned clients. These systems and methods may also enable system administrators to recover data from a deleted volume and/or efficiently create a new volume.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of the various systems described herein may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a computing system into a device for asynchronous reclamation of storage space from deleted volumes.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reclaiming storage space from thin-provisioned storage systems, at least a portion of the method being performed by a computing device comprising at least one processor, the method comprising:
   identifying a deleted volume;
   identifying a plurality of disks within a thin-provisioned storage system that allocated storage space to the deleted volume;
   in response to the deleted volume being deleted, identifying reclaimable storage space made available by the deletion of the deleted volume by, for each disk within the plurality of disks, saving information on the disk that:
      indicates that the disk contains reclaimable storage space;
      identifies which locations of the storage space were allocated by the disk to the deleted volume before it was deleted;
   identifying a policy that specifies reclaiming the storage space that was allocated to the deleted volume before it was deleted asynchronously with respect to the deletion of the deleted volume;
   using the information saved on each disk to reclaim the storage space that was allocated to the deleted volume before it was deleted asynchronously with respect to the deletion of the deleted volume in accordance with the policy.

2. The computer-implemented method of claim 1, wherein the policy comprises a policy to reclaim the storage space at a predetermined time of day.

3. The computer-implemented method of claim 1, wherein the policy comprises a policy to reclaim the storage space when an input/output system that includes the storage space is idle.

4. The computer-implemented method of claim 3, further comprising at least one of:
   monitoring the input/output system to determine when the input/output system is idle;
   monitoring applications that use the input/output system to determine when the applications are idle.

5. The computer-implemented method of claim 1, wherein reclaiming the storage space asynchronously comprises launching a daemon for reclaiming storage space.

6. The computer-implemented method of claim 1, wherein reclaiming the storage space asynchronously comprises:
   identifying a request to create a new volume;
   reallocating at least a part of the storage space for the new volume.

7. The computer-implemented method of claim 1, further comprising deleting the information from each disk after reclaiming the storage space that was allocated to the deleted volume.

8. The computer-implemented method of claim 1, wherein reclaiming the storage space asynchronously comprises:
   prior to reclaiming the storage space, receiving a request to recover data from the storage space;
   delaying the reclamation of the storage space until after the data has been recovered from the storage space.

9. A system for reclaiming storage space from thin-provisioned storage systems, the system comprising:
   an identification module programmed to identify a deleted volume;
   a saving module programmed to:
      identify a plurality of disks within a thin-provisioned storage system that allocated storage space to the deleted volume;
      in response to the deleted volume being deleted, identify reclaimable storage space made available by the deletion of the deleted volume by, for each disk within the plurality of disks, saving information on the disk that:
         indicates that the disk contains reclaimable storage space;
         identifies which locations of the storage space were allocated by the disk to the deleted volume before it was deleted;
   a policy module programmed to identify a policy that specifies reclaiming the storage space that was allocated to the deleted volume before it was deleted asynchronously with respect to the deletion of the deleted volume;
   a reclamation module programmed to use the information saved on each disk to reclaim the storage space that was allocated to the deleted volume before it was deleted asynchronously with respect to the deletion of the deleted volume in accordance with the policy;
   at least one hardware processor configured to execute the identification module, the saving module, the policy module, and the reclamation module.

10. The system of claim 9, wherein the policy comprises a policy to reclaim the storage space at a predetermined time of day.

11. The system of claim 9, wherein the policy comprises a policy to reclaim the storage space when an input/output system that includes the storage space is idle.

12. The system of claim 11, wherein the policy module is further programmed to monitor at least one of:
   the input/output system to determine when the input/output system is idle;
   applications that use the input/output system to determine when the applications are idle.

13. The system of claim 9, wherein the reclamation module is programmed to reclaim the storage space asynchronously by:
   identifying a request to create a new volume;
   reallocating at least a part of the storage space for the new volume.

14. The system of claim 9, wherein the reclamation module is further programmed to delete the information from each disk after reclaiming the storage space that was allocated to the deleted volume.

15. The system of claim 9, wherein the reclamation module is programmed to reclaim the storage space asynchronously by:
   prior to reclaiming the storage space, receiving a request to recover data from the storage space;
   delaying the reclamation of the storage space until after the data has been recovered from the storage space.

16. A non-transitory computer-readable-storage medium comprising one or more computer-executable instructions that, when executed by at least one processor of a computing device, cause the computing device to:
   identify a deleted volume;
   identify a plurality of disks within a thin-provisioned storage system that allocated storage space to the deleted volume;
   in response to the deleted volume being deleted, identify reclaimable storage space made available by the deletion of the deleted volume by, for each disk within the plurality of disks, saving information on the disk that:
      indicates that the disk contains reclaimable storage space;

identifies which locations of the storage space were allocated by the disk to the deleted volume before it was deleted;

identify a policy that specifies reclaiming the storage space that was allocated to the deleted volume before it was deleted asynchronously with respect to the deletion of the deleted volume;

use the information saved on each disk to reclaim the storage space that was allocated to the deleted volume before it was deleted asynchronously with respect to the deletion of the deleted volume in accordance with the policy.

* * * * *